July 27, 1965
N. D. NEWBY ETAL
3,197,654
NEGATIVE-RESISTANCE DIODE DETECTOR
Filed June 22, 1961
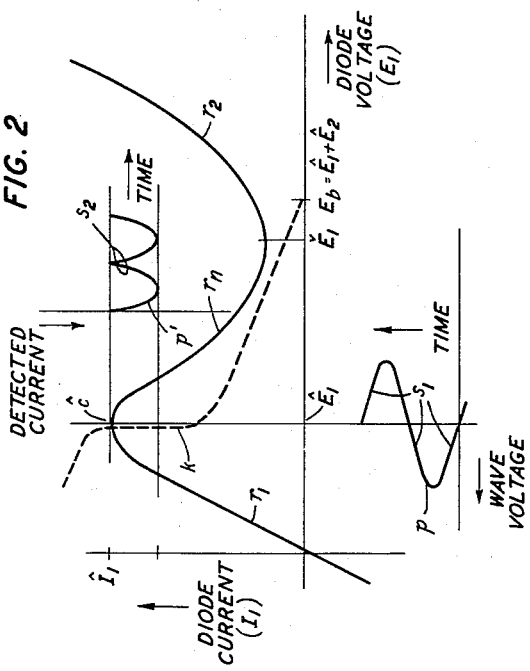
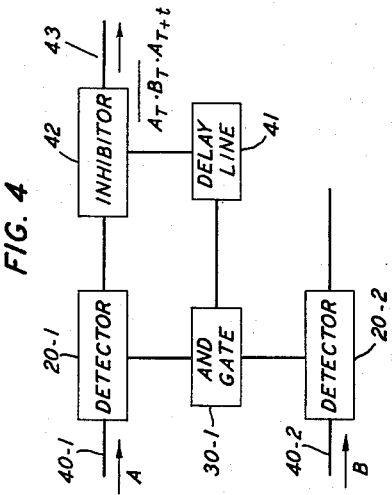
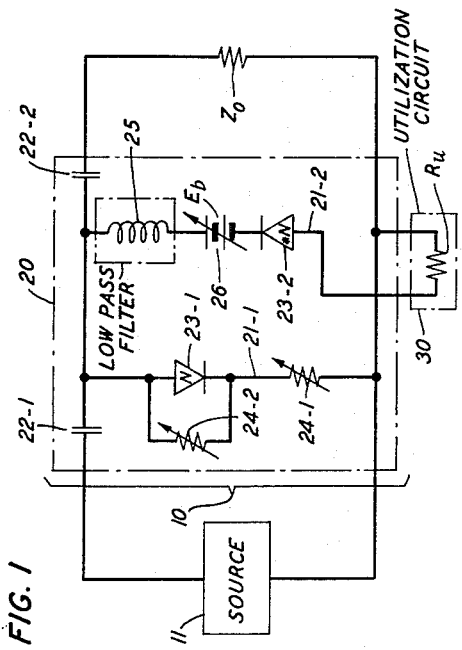
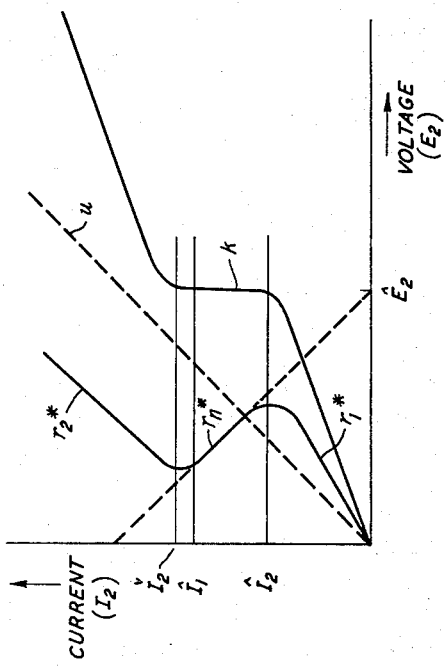
INVENTORS: *N. D. NEWBY*
*W. C. G. ORTEL*
BY
*Harry C. Hart*
ATTORNEY

United States Patent Office 3,197,654
Patented July 27, 1965

3,197,654
NEGATIVE-RESISTANCE DIODE DETECTOR
Neal D. Newby, Leonia, N.J., and William C. G. Ortel,
New York, N.Y., assignors to Bell Telephone Laboratories, Incorporated, New York, N.Y., a corporation of
New York
Filed June 22, 1961, Ser. No. 118,951
7 Claims. (Cl. 307—88.5)

This invention relates to the detection of wave presence and more particularly to the accomplishment of such detection through the use of negative resistance diodes.

In detection employing ordinary diodes, an indication of wave presence is given by converting the wave, or a portion of it, into an indicator signal. When converted in its entirety, the wave is no longer available for further processing in its original form. Accordingly, one object of the invention is to detect the presence of a wave without substantially altering its form.

When but a portion of the wave is converted, energy is abstracted from the wave, causing its amplitude to be reduced. Hence, a related object of the invention is to detect a wave with minimal abstraction of its energy, i.e., to render a diode detector substantially lossless.

Nevertheless, the indicator signal derived during detection should have an appreciable energy content if it is to be utilizable. This content depends upon the amplitude level of the wave being detected and results in wide variations in detector loading. As a result, the operating level of the detector may shift erratically in response to loading. Therefore, it is a further object of the invention to stabilize a lossless detector subjected to varying degrees of loading. A concurrent object is to constrain the detector to a prescribed operating point.

Once waves are detected, they can be processed to produce various "logical" combinations. Typical combinations generated by logic circuits are of the "and," the "or" and the "and-not" varieties. It is a still further object of the invention to facilitate the detection of incoming waves that activate logic circuits.

The invention accomplishes the above and related objects through the employment, in a wave path, of a negative resistance diode that is biased and resistively augmented to operate at a point of symmetry between its regions of positive and negative resistance. In this way a positive resistance presented to a half cycle of a wave being detected is balanced by a negative resistance over an ensuing half cycle. As a result, a uniform full-wave-rectified signal appears in the bias circuit. Such a signal does not contain a component having the fundamental frequency of the detected wave, so that there is no energy flow in the detector diode at that frequency, and the diode is thus said to be lossless.

Moreover, there will be no reflection of the wave being detected and the diode is, in effect, matched to the wave path.

It is a feature of the invention that, to prevent loading from disturbing the bias point, the bias circuit includes a conjugate diode with a negative resistance characteristic which is resistively augmented to achieve parameter constancy in the loading interval.

Other features of the invention will become apparent after the consideration of several illustrative embodiments, taken in conjunction with the drawings in which:

FIG. 1 is a schematic diagram of a lossless detector according to the invention;

FIG. 2 is a graph explanatory of lossless detection;
FIG. 3 is a graph explanatory of biasing stabilization for a lossless detector; and
FIG. 4 is an AND-NOT logic circuit incorporating a pair of lossless detectors.

Turn now to FIG. 1 showing a lossless detector 20 included in a transmission path 10 that extends between a source 11 and a load 12. For convenience, both the source and load impedances are matched to the characteristic impedance $Z_0$ of the path 10. There are two shunt paths 21–1 and 21–2 in the detector. These paths are jointly isolated from the transmission path 10 for steady signals by respective blocking capacitors 22–1 and 22–2. In the first path 21–1 a negative resistance diode 23–1 is accompanied by series and shunt padding resistors 24–1 and 24–2. The second path 21–2 includes, in tandem connection, an inductor 25 which serves as a low-pass filter, a source 26 of biasing potential and a negative resistance diode 23–2 whose characteristic is conjugate to that of the diode 23–1 in the first path 21–1. The second path 21–2 is completed by way of a utilization circuit 30 which has a prescribed composite resistance $R_u$.

To understand the operation of the lossless detector, consider the characteristic $r_1$–$r_n$–$r_2$ of a typical negative resistance diode as shown in FIG. 2. Since the negative resistance region $r_n$ of the diode cannot extend indefinitely, it is terminated by positive resistance regions $r_1$ and $r_2$ at its upper and lower extremities. For convenience, the terminating regions $r_1$ and $r_2$ in FIG. 2 are those associated with a voltage-controlled characteristic; i.e., the current $I_1$ is a single-valued function of voltage $E_1$, while the voltage $E_1$ is a multivalued function of current $I_1$. As shown, the characteristic $r_1$–$r_n$–$r_2$ is symmetrical about its low voltage threshold $\hat{E}_1$ at a point of contiguity $\hat{c}$ of the first region of positive resistance $r_1$ and the region of negative resistance $r_n$. Such a characteristic is presented by negative resistance diodes of the Esaki type whose manufacture has been carefully controlled. However, asymmetry may exist as between the two regions $r_1$ and $r_n$, in which case the diode 23–1 (FIG. 1) is padded either by a shunt resistor 24–2 or by a series resistor 24–1 depending upon whether the slope of the negative resistance region $r_n$ is greater than, or less than, that of the positive resistance region $r_1$. The exact nature of this padding will become more fully apparent later.

When it is desirable to prevent negative resistance effects at the source 11 in FIG. 1, the characteristic impedance $Z_0$ of the transmission path 10 is made substantially smaller than the negative resistance $r_n$ of the diode 23–1.

Assume that the second branch 21–2 provides (1) a resistance whose load line in FIG. 2 is vertical over an appreciable interval and (2) a biasing voltage which fixes the operating point of the diode 23–1 near its low voltage threshold $\hat{E}_1$. This operating point is particularly desirable with diodes of the Esaki type. In the vicinity of the peak point $\hat{c}$ of the characteristic, i.e., the low voltage threshold $\hat{E}_1$, the current-voltage behavior of the diode is attributable to the tunneling phenomenon of majority carriers which are able to respond to rapid changes in signal. While the symmetry condition could be just as easily satisfied with the bias at the valley point $\check{c}$ of the characteristic, i.e., the high voltage threshold $\check{E}_1$, minority carriers, moving by diffusion, are operative there with a consequent slower signal response.

When an incoming wave that has originated at the source 11 arrives at the diode 23–1, its undulations take place about the operating point $\hat{c}$ as indicated for one cycle on the voltage-time subgraph $S_1$ of FIG. 2. The excursion for the positive half cycle $p$ is in the positive resistance region and produces a counterpart waveform $p'$ on a current-time subgraph $S_2$ of FIG. 2. Likewise the second half cycle in the negative resistance region produces a similar counterpart waveform. It is immediately seen that the current waveform $S_2$ does not contain any component at the fundamental frequency of the voltage waveform. Consequently, there can be no fundamental frequency power dissipation at the diode 23–1 and the incoming wave is detected without loss. The high-frequency components of the current waveform $S_2$ are bypassed by the intrinsic shunt capacitance that accompanies a voltage-controlled diode. When the intrinsic bypass action is insufficient, the diode can be shunted by an externl high-pass filter (not shown).

In order to achieve lossless detection of the incoming wave over an appreciable range of input variation, the detector diode 23–1 is presented with a load line $k$ having an extended interval of verticality about the operating point. This condition implies that the direct current impedance in the bias path 21–2 be substantially zero over the verticality interval. Hence, variations in bias current, which would otherwise cause a shift in the operating point $\hat{c}$, cannot disturb the symmetry that is necessary for lossless detection.

To stabilize the biasing point $\hat{c}$, advantage is taken of the conjugacy of certain negative resistance diodes. When the diode in the first path is of the voltage-controlled type, the diode in the biasing path is of the current-controlled type, with a characteristic $r_1^*-r_n^*-r_2^*$ of the kind shown in FIG. 3. A composite characteristic $k$ for the conjugate diode 23–2 and the utilization circuit 30 is had by summing the abscissas for the conjugate characteristic $r_1^*-r_n^*-r_2^*$ and the utilization resistance characteristic $u$. The resistive magnitude of the utilization resistance $R_u$ is made substantially equal to that of the conjugate diode 23–2 in its negative resistance region $r_n^*$, so that the composite characteristic $k$ has an appreciable interval of constant voltage. To prevent instability the utilization resistance $R_u$ is made slightly larger than the negative resistance $r_n^*$. It is to be noted that the equivalent series resistance of the utilization circuit 30 has the effect of shifting the diode characteristic in the abscissa direction. Analogously, a shunt connected resistor would produce an alteration of the characteristic in the ordinate direction. Since the diode 23–1 of the first path 21–1 is dual to the diode 23–2 in the second path 21–2, its padding resistors 24–1 and 24–2 produce comparable characteristics whose current-voltage axes are interchanged.

With reference again to FIG. 2, the composite characteristic $k$ of FIG. 3 is caused to appear there as a load line by being reversed and plotted from the magnitude of the biasing voltage $E_b$ as a point of origin. The bias voltage $E_b$ is proportioned to equal the sum of the threshold voltages $\hat{E}_1$ and $\hat{E}_2$ for the characteristics $r_1-r_D-r_2$ and $k$, so that the interval of constancy appears near the peak threshold $\hat{c}$ in FIG. 2. Further restrictions are that the high current threshold $\hat{I}_2$ of the loading characteristic $k$ exceed the peak current $\hat{I}_2$ of the loaded characteristic $r_1-r_n-r_2$ and that the changed diode current, because of detection, must not fall below the low current threshold $\check{I}_2$ of the loading characteristic $k$.

Using well-known principles the circuit of FIG. 3 is readily convertible into its dual counterpart.

An illustration of one of the many logic circuits that can be constructed with lossless detectors is given in FIG. 4 by an AND-NOT gate that is formed by including lossless detectors 20–1 and 20–2 of the kind shown in FIG. 1 in respective transmission paths 40–1 and 40–2 of time varying waves A and B amplitude modulated into pulses of a binary code with a digit interval $t$. The waves are detected at time T. Their indicator signals are combined in an AND gate utilization circuit 30–1 whose output is appropriately delayed by a time $t$ in a delay line 41 and applied to an inhibitor 42. Hence, the outgoing signals on the output path 43 may be stated as $(A_T+t)\overline{(A_T \cdot B_T)}$ ("A" at time T+$t$ and not the combination of "A" and "B" at time T), since the simultaneous detection of A and B causes the subsequent "A" digit to be suppressed by the inhibitor but otherwise passes it unaltered.

Additional adaptations of the lossless detector in other logic circuits will occur to those skilled in the art. Also apparent will be related modifications of the detector itself, as, for example, in wave guide systems, where the low-pass filter can take the form of a quarter-wave trap.

What is claimed is:

1. Apparatus for coupling a source to a load which comprises
   a transmission path interconnecting the source with the load,
   a negative resistance diode included in said transmission path and having a current-voltage characteristic with contiguous regions of positive and negative resistance,
   means for biasing said diode to a point of contiguity, said means for biasing comprising a second negative resistance diode whose current-voltage characteristic is dual to that of the first mentioned negative resistance diode,
   and means external to said diode for rendering said characteristic substantially symmetrical for an interval about the point of contiguity of said regions of positive and negative resistance.

2. Apparatus as defined in claim 1 wherein the first-named negative resistance diode is of the voltage-controlled type and said second negative resistance diode is of the current-controlled type.

3. Apparatus responsive to a wave propagated from a source to a load which comprises a first path connected in shunt with (1) the source and (2) the load and containing a first device displaying a region of negative resistance in its current-voltage characteristic, and a second path connected in shunt with (1) said source and (2) said load and containing a second device whose current-voltage characteristic is dual to that of said first device.

4. Apparatus for detecting the presence of a wave propagated from a source to a load which comprises a first detector path connected in shunt with (1) the source and (2) the load and containing a first negative resistance diode, and a second detector path connected in shunt with (1) said source and (2) said load and containing the series combination of a low-pass filter, a source for biasing said first negative resistance diode, a utilization circuit, and a second negative resistance diode whose current-voltage characteristic is dual to that of said first negative resistance diode.

5. Apparatus as defined in claim 4 further including means for jointly isolating the detector paths from said source and said load for steady signals supplied by said biasing source.

6. Apparatus as defined in claim 1 further including for the propagated wave, a transmission path whose characteristic impedance is proportioned to be smaller in magnitude than the negative resistance of said first negative resistance diode.

7. Apparatus as defined in claim 4 wherein said first negative resistance diode is of the voltage controlled variety and the components of said second biasing path are proportioned to present said first negative resistance diode with a substantially constant-voltage load line in the vicinity of the threshold point between contiguous regions of positive and negative resistance.

References Cited by the Examiner

UNITED STATES PATENTS

| | | | |
|---|---|---|---|
| 2,193,578 | 3/40 | Bruce | 328—252 X |
| 2,585,571 | 2/52 | Mohr | 307—88.5 X |
| 3,108,229 | 10/63 | Herzog | 329—205 X |
| 3,119,072 | 1/64 | Sommers | 329—205 X |
| 3,119,936 | 1/64 | Bergman | 307—88.5 |
| 3,119,937 | 1/64 | Bergman | 307—88.5 |
| 3,122,608 | 2/64 | Taylor | 307—88.5 X |

OTHER REFERENCES

Clark et al.: article, Electronics, Mar. 24, 1961 pages 36–39.

Haddon et al.: article, I.B.M. Tech. Disclosure Bulletin, vol. 2, No. 5, February 1960, page 53.

Article by Lesk et al.: I.R.E. Wescon Convention Record, Part 3, Electron Devices, Aug. 18–21, 1959, pages 9–31.

JOHN W. HUCKERT, *Primary Examiner.*

GEORGE N. WESTBY, ARTHUR GAUSS, *Examiners.*